UNITED STATES PATENT OFFICE.

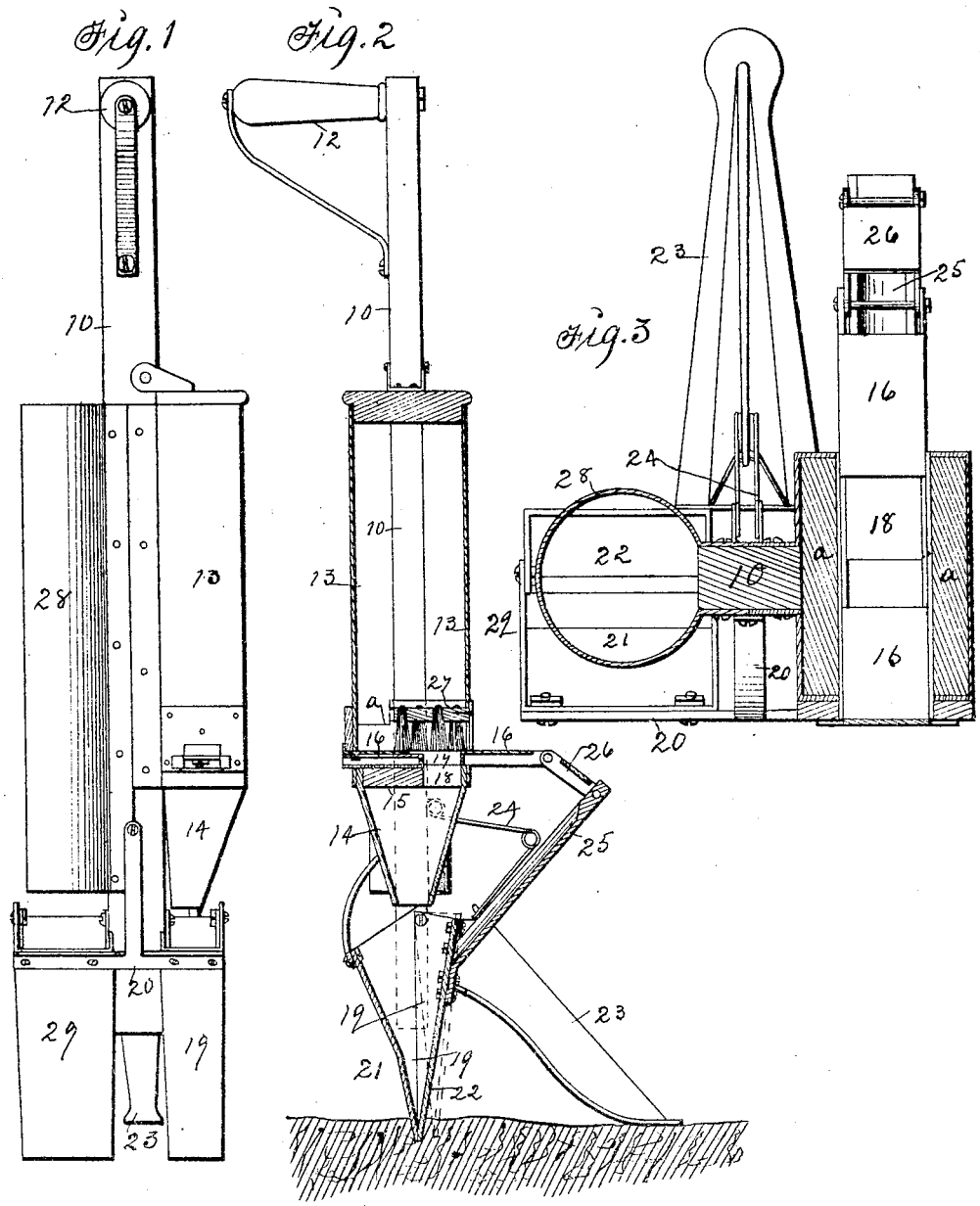

REINERT THOMPSON, OF WAUTOMA, WISCONSIN, ASSIGNOR OF ONE-HALF TO JAMES M. LARSON, OF WAUTOMA, WISCONSIN.

POTATO-PLANTER AND FERTILIZER-DROPPER.

No. 803,728.  Specification of Letters Patent.  Patented Nov. 7, 1905.

Application filed November 7, 1904. Serial No. 231,761.

*To all whom it may concern:*

Be it known that I, REINERT THOMPSON, a citizen of the United States, residing at Wautoma, in the county of Waushara and State of Wisconsin, have invented a new and useful Potato-Planter and Fertilizer-Dropper, of which the following is a specification.

My object is to provide an implement adapted to be operated by hand for planting potatoes and also at the same time deposit fertilizing material at the side of each potato or piece of seed-potato when it is deposited.

My invention consists in the construction, arrangement, and combination of elements and subcombinations, as hereinafter set forth, pointed out in my claim, and illustrated in the accompanying drawings, in which—

Figure 1 is a side elevation of the machine and shows the positions of all the operative parts relative to each other and the upright that has a handle at its top. Fig. 2 is a longitudinal sectional view, and dotted lines indicate the movements of operative parts as required for opening the pockets at the bottom for discharging and depositing in the ground fertilizing material; and Fig. 3 is an enlarged transverse sectional view of Fig. 1 and shows the slide-valve and the operating mechanism for discharging fertilizing material from a reservoir into a pocket and from the pocket into the ground.

The numeral 10 designates an upright, preferably wood, that is provided with a handle 12 at its top, adapted for carrying and manually operating the implement with one hand.

A reservoir 13 for powdered or comminuted fertilizing material, preferably made of sheet metal and angular in cross-section, is fixed to one side of the upright 10, as shown in Figs. 1 and 3, or in any suitable way.

A funnel-shaped extension 14 has a valve-seat 15 fixed in its top, and the top of the extension is fixed in the bottom of the reservoir 13. A slide-valve 16 is fitted on top of the valve-seat and slidably connected with the bottom of the reservoir and extended through apertures in the sides of the reservoir that serve as bearings for the said valve. A port 17 in the valve 16 when brought into coinciding position with the port 18 in the fixed valve-seat 15 allows a limited quantity of the fertilizer stuff to pass down through the ports and to drop into a pocket 19, connected with a frame 20, that is fixed to the upright 10. The pocket is composed of two open-topped tapering parts 21 and 22, pivotally connected at their tops and jointly fastened to the lower end of the upright 10 by means of a screw, as shown in Fig. 2, or in any suitable way as required to allow their lower ends to be parted for discharging the fertilizing matter.

A foot 23 is fixed to the frame 20, and a duplex wire spring 24 normally retains the bottom of the pocket closed. An arm 25 is fixed to the frame 20, and a link 26 is pivotally connected with the top of the arm and also pivotally connected with the end of the slide-valve 16 in such a manner that when the foot 23 is pressed on the ground for opening the bottom of the pocket the slide-valve will at the same time be moved inward, as required, to close the ports to prevent fertilizing material from dropping from the reservoir 13 while the pocket is open to discharge the matter previously dropped into the pocket from the reservoir when the pocket was closed, and when the slide-valve is thus operated for discharging matter to drop into the pocket the port 17 will be again filled with matter, and a brush 27, fixed in the reservoir to engage the top of the brush, will close the port 17 as the valve makes a reverse motion and prevent matter from being carried on top of the valve into the port. The discharge of matter from the reservoir into the pocket is thus regularly and automatically measured by the size of the port 17 in the slide-valve 16 every time a potato is planted.

An open-ended tube 28 is fixed to the side of the upright 10 opposite to the reservoir 13 for conveying seed-potatoes into a pocket 29 corresponding with the pocket 19 and also fixed to the frame 20 in parallel position with the pocket 19 in such a manner that the two pockets will be simultaneously opened when the foot is pressed upon the ground, as required, to plant a potato and deposit fertilizing matter in the ground at the same time, and whenever the implement is pressed downward by the person carrying and operating it with one hand with the other hand he can take a seed-potato from a haversack swung on his shoulders and drop it through the conveyer-tube 28 into the closed pocket 29, as required, to plant the potatoes at regular distances apart and simultaneously deposit fertilizing material therewith as he walks along across a plowed field.

Having thus described the purpose of my invention and the construction and function of each element and subcombination, the practical operation and utility thereof will be readily understood by persons familiar with the art to which it pertains, and

What I claim as new, and desire to secure by Letters Patent, is—

An implement for measuring and depositing fertilizing material and seed-potatoes in the ground simultaneously by the downward thrust of the machine comprising an upright having a handle at its top, a reservoir having a slide-valve in its bottom and a port in the valve adapted for admitting fertilizer material, a fixed valve-seat having a port, a funnel-shaped extension of the reservoir below the slide-valve and fixed valve-seat, a frame fixed to the lower end of the upright, two pockets composed of two parts and one part fixed to the frame and to the lower end of the upright and the other part pivotally connected with the lower end of the upright, a foot fixed to the pivoted part of the pocket, a spring fixed to the pivoted part of the pocket and to the upright, an arm fixed to the pivoted part of the pocket to extend upward and connected with the end of the slide-valve by a link, an open-ended tube fixed to the upright for conveying potatoes into the pocket under it, all arranged and combined to operate in the manner set forth for the purposes stated.

REINERT THOMPSON.

Witnesses:
 JOHN CLARK,
 J. B. CASTERTINE.